United States Patent [19]

Drori

[11] Patent Number: 4,736,671
[45] Date of Patent: Apr. 12, 1988

[54] FLUID PRESSURE CONTROL DEVICE

[76] Inventor: Mordeki Drori, 89 Zahal Street, Kiron, Israel

[21] Appl. No.: 821,799

[22] Filed: Jan. 23, 1986

Related U.S. Application Data

[62] Division of Ser. No. 599,261, Apr. 11, 1984, Pat. No. 4,614,581.

[30] Foreign Application Priority Data

Apr. 14, 1983 [IL] Israel ............................. 68403

[51] Int. Cl.$^4$ ................ F15B 13/042; F16K 31/365
[52] U.S. Cl. ........................................ 91/401; 91/52; 91/405; 137/556; 251/14; 251/28; 251/33; 251/35; 251/61.4; 210/108
[58] Field of Search ............ 91/401, 405, 407, 52; 137/556; 251/14, 28, 33, 35, 61.4; 210/108, 130

[56] References Cited

U.S. PATENT DOCUMENTS 2,320,011  5/1943  Reynolds ..................... 251/14 X
4,036,433  7/1977  Wagner et al. ............ 137/625.26 X
4,278,540  7/1981  Drori .............................. 210/108 X
4,450,861  5/1984  Bouteille ........................... 137/553

Primary Examiner—Gerald A. Michalsky
Attorney, Agent, or Firm—Benjamin J. Barish

[57] ABSTRACT

A fluid pressure control device is described effective to actuate an external device when the differential-pressure between a high-pressure fluid source and a lower pressure fluid source rises to a predetermined magnitude. The control device comprises a housing having a partition wall therein dividing its interior into two compartments communicating with each other through an opening in the partition wall. A differential-pressure sensing member is disposed in one of the compartments and is movable therein in response to the sensed differential-pressure. A stem is fixed to the differential-pressure sensing member so as to be moved therewith and carries a valve member at one end for moving it with respect to the valve opening to control the flow of the fluid therethrough and thereby to actuate the external device.

14 Claims, 1 Drawing Sheet

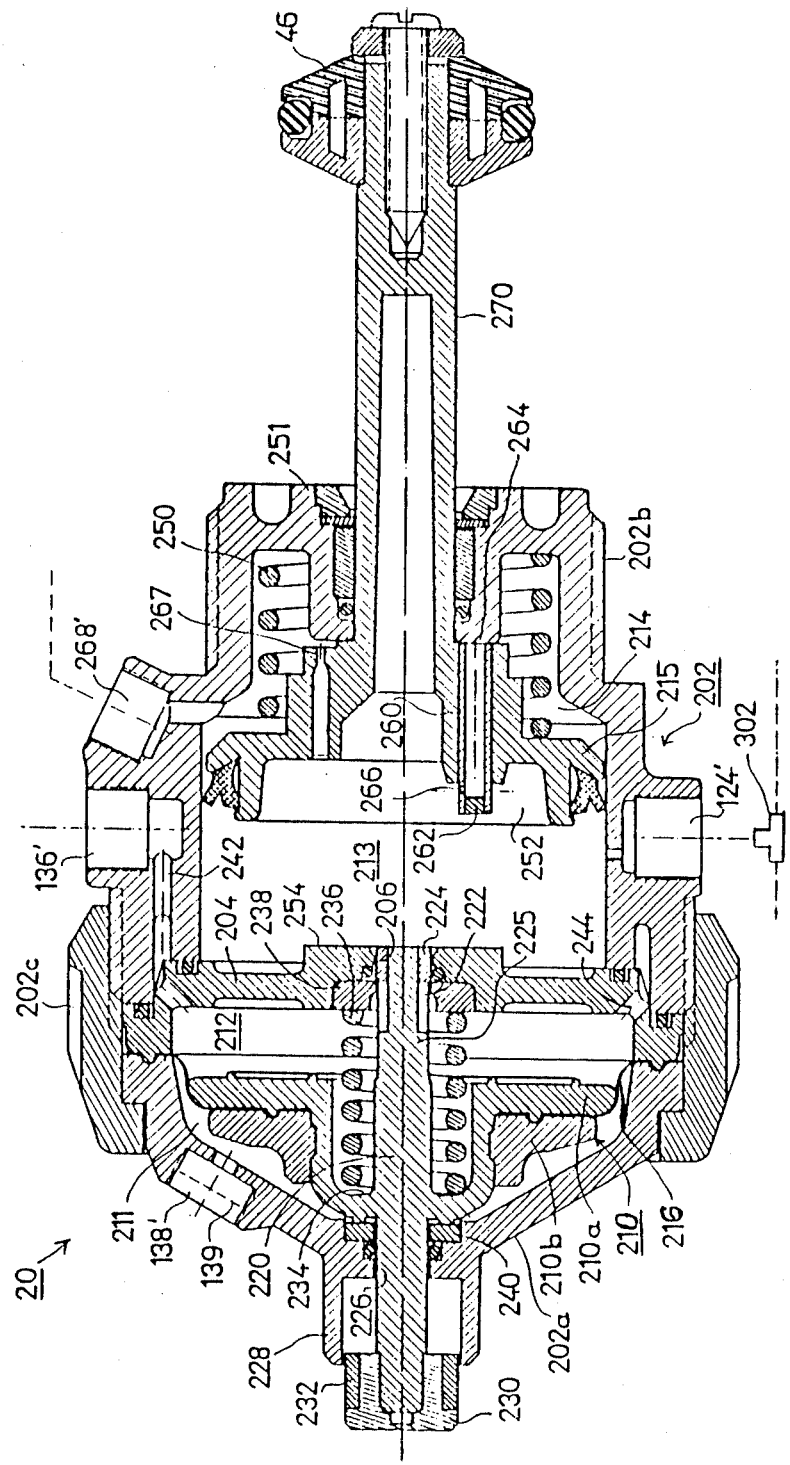

ial-pressure sensing member, and
thereby the state of cleanliness of the filter body.

FLUID PRESSURE CONTROL DEVICE

RELATED APPLICATIONS

The present application is a division of patent application Ser. No. 599,261 filed Apr. 11, 1984, now U.S. Pat. No. 4,614,581 and relates to a fluid pressure control device particularly useful in the backwashable filter described in that patent application.

BACKGROUND OF THE INVENTION

The invention of the present application relates to a fluid pressure control device for actuating an external object. The control device of the present application is particularly useful in the backwashable filter described in patent application Ser. No. 6599,261, now U.S. Pat. No. 4,614,581, for initiating a backwash operation when the pressure drop across the filter body rises above a predetermined magnitude, thereby indicating that the filter body is overly clogged and should be cleaned.

BRIEF SUMMARY OF THE INVENTION

According to the invention of the present application, there is provided a fluid pressure control device for actuating an external device, comprising: a housing having a partition wall dividing its interior into at least two compartments; the partition wall being formed with an opening therein establishing communication between the two compartments; a displaceable member displaceable in one of the compartments and defining a first and a second chamber on opposite sides thereof; a stem fixed to the displaceable member; a valve member carried at one end of the stem and movable thereby to open and close the valve opening; a spring biassing the displaceable member to the position wherein its valve member closes the valve opening; a a first inlet port in the housing communicating with the chamber on the side of the displaceable member opposite to the partition wall, for inletting a first control pressure; a second inlet port in the housing communicating with the chamber between the displaceable member and the partition wall for inletting a second control pressure into the chamber effective, when the second control pressure is lower than the first control pressure by a predetermined magnitude, to cause the first control pressure to displace the displaceable member against the bias of the spring to move the valve member to open the valve opening, and thereby to transfer the second control pressure via the valve opening to the second compartment; and means communicating with the second compartment for actuating the external device in response to the transfer of the control pressure from the inlet port to the second compartment.

When the control device is used with the backwash filter of the above-cited patent application, the displaceable member serves as a differential-pressure sensing member, and the control device includes a high-pressure connection to the upstream side of the filter body, and a lower pressure connection is to its downstream side, so that a backwash operation is automatically initiated whenever the difference in the two pressures, representing the pressure drop across the filter body, rises to a predetermined magnitude. The backwash operation may also be manually initiated whenever desired by manually depressing a projecting end of the stem fixed to the differential-pressure sensing member.

According to another feature of the invention of the present application, the projecting end of the stem carries an indicator button to visually indicate the position of the differential-pressure sensing member, and thereby the state of cleanliness of the filter body.

BRIEF DESCRIPTION OF THE DRAWINGS

The single figure of the drawings illustrate a preferred form of differential-pressure control device in accordance with the present invention.

DETAILED DESCRIPTION OF THE PREFERRED EMBODIMENT

The control unit illustrated in the drawing, and therein generally designated 20, includes a housing 202 whose interior is divided into two compartment by means of a partition or wall plate 204 formed with a central opening 206 permitting communication between the two compartments. To facilitate assembly and disassembly, the housing is formed of two sections 202a, 202b secured together by a nut 202c with partition or wall plate 204 clamped in between.

Disposed within the compartment on one (left) side of partition wall 204 is a differential-pressure sensing member 210 dividing that compartment into two chambers 211 and 212. The other compartment on the opposite side of partition wall 204 is also divided into two chambers 213, 214 by a second displaceable member 215. The amount of displacement of member 210 is relatively small, and therefore it includes a diaphragm 216, clamped at its outer periphery between the two housing sections 202a, 202b, and at its inner periphery between the two displaceable member sections 210a, 210b.

Displaceable member 210 acts as a differential-pressure sensor for sensing the pressure drop across the filter body, i.e., the difference in pressure between its upstream and downstream sides, and moves a control valve in response thereto to control the flow through opening 206 of the partition plate 204. Displaceable member 215 controls the displacement of a main valve member 46 in the filter, and is in the form of a piston movable within a cylindrical portion of housing 202. The construction of the filter, and the manner in which piston 215 controls a backwash operation therein, are disclosed in the above-cited patent application.

With respect to displaceable member 210, it will be seen that its main section 210a is formed with a central stem 220 aligned with central opening 206 through partition wall 204. The inner end of stem 220 is of reduced cross-sectional area, shown at 222, so that its cross-sectional area is less than that of opening 206. The inner tip of stem 220 receives a ring 224 to increase the cross-sectional area of this inner tip to equal that of opening 206 such that the stem includes an inner section (that defined by ring 224) of the same cross-sectional area as opening 206, an adjacent section 222 of smaller cross-sectional area than opening 206 (which section is of longer axial length than the axial length of the opening), and a third section 225 (that defined by the next adjacent section of the stem) of the same (or greater) cross-sectional area as opening 206.

The outer end of stem 220 projects through an opening 226 formed in the control unit housing 202 and is circumscribed by a cylindrical collar 228. This end of stem 220 projecting externally of the sensor housing is provided with a cap 230 carrying a plurality of differently-marked (e.g., differently colored) rings 232, for a purpose to be described below.

Section 210a of displaceable member 210 is formed with a socket 234 for receiving a coiled spring 236 between it and an abutment ring 238 carried by the partition wall 204. Spring 236 thus biases stem 220 further through the housing opening 226, the position of the stem being limited by another abutment member 240 engageable with the opposite side of socket section 234 of the displaceable member 210.

Housing 202 includes an inlet port 138' connected to the upstream side of the filter body; therefore the presure within chamber 211 will be that at the upstream side of the filter body. Since port 138' receives the unfiltered water at the upstream side of the filter, it includes a screen 138. The pressure in chamber 212 at the opposite side of displaceable member 210 is that of the downstream side of the filter body, this pressure being transmitted to chamber 212 via a port 136', a bore 242 through the control device housing section 202b, and a bore 244 through the partition wall 204.

It will thus be seen that when the differential-pressure between the upstream and downstream sides of the main filter body are less than a predetermined magnitude (indicating a relatively clean filter), displaceable member 210 will be located, by virtue of spring 236, in the illustrated position wherein ring 224, at the end of stem 220, is disposed within opening 206 through the partition wall 204, thereby preventing any flow from chamber 212 on one side of the partition wall to chamber 213 on the opposite side of the partition wall. However, when the pressure at the downstream port 136' drops such that the differential-pressure rises to a predetermined magnitude, member 210 will be displaced, against the action of spring 236, to move the reduced cross-sectional area 222 of its stem 220 within opening 206 through the partition wall 204, thereby establishing communication between the two chambers 212 and 213. However, should the differential-pressure further increase in magnitude, displaceable member 210 will be moved further against the action of spring 236 to bring section 225 of the stem into opening 206 thereby again terminating the communication between the two chambers 212, 213 on the opposite sides of the partition wall 204.

Piston 215 movable in the compartment on the opposite side of partition wall 204, is biased towards the partition wall by a coil spring 250 interposed between the piston and the end wall 251 of the control device housing 202. Thus, spring 250 tends to contract chamber 213 defined by the piston 215 and the partition wall 204. Piston 215 is formed with a cylindrical recess 252 receivable within a cylindrical embossment 254 formed in partition wall 204, and of smaller diameter than recess 252, when the piston is urged against partition wall 204 by spring 250.

Piston 215 is further formed with an axial bore extending therethrough and slidably receiving a cylindrical sleeve 260. This sleeve is open at one end but is closed at the opposite end by a plug 262. Sleeve 260 is of greater length than the thickness of the piston at this location, and is adapted to engage an annular abutment 264 formed in the inner face of end wall 251 when the piston is moved to its extreme extended position wherein chamber 213 is of maximum volume and chamber 214 at the opposite side of the piston is of minimum volume. When sleeve 261 engages abutment 264, the end of the sleeve carrying plug 262 projects into chamber 213. This projecting end of the sleeve is formed with a radially-extending bore 266 which establishes communication between chambers 213 and 214 on the opposite sides of the sleeve.

Piston 215 is further formed with a small bore 267 to provide a slow-acting vent between the two chambers on the opposite sides of the piston.

Control device housing 202 includes a further port 124' which leads to the compartment on the side of the partition wall 204 within which piston 215 is movable. In the illustrated extended position of piston 215, port 124' communicates with chamber 213, but in the retracted position of the piston, wherein the piston is moved towards or into contact with partition wall 204, port 124' communicates with chamber 214 on the opposite sides of the piston. Port 124' is connected via a fitting 302 to a pressure sustaining valve in the filter for sustaining the outlet pressure during a backwash operation, and also to a timer for terminating the backwash operation, both as described in the above-cited patent application.

Control device housing 202 further includes an additional port 268 leading to the atmosphere directly, or via the timer. Port 268' always communicates with chamber 214.

Piston 215 includes a stem 270 carrying the main valve member 46 which initiates or terminates the backwash operation. Thus, in the retracted position of piston 215, wherein it is in contact with partition wall 204 and chamber 213 is at its minimum volume, the main valve member 46 is seated within a valve opening so that no backwash operation is performed; but when the displaceable member 215 is moved to its extended position, away from partition wall 204, valve member 46 is unseated from its valve opening to initiate a backwash operation.

The illustrated control device, when used with a backwash filter as described in the above-cited patent application, operates as follows:

When the filter is initially connected to the fluid supply line, and the line has not yet been filled, spring 236 in the control unit 20 urges the differential-pressure sensing member 210 to its normal position wherein ring 224 at the end of its stem 220 blocks communication between the two chambers 212, 213 on opposite sides of the partition wall 204; and spring 250 urges piston 252 to its fully retracted position wherein it is against the partition wall 204 and its chamber 213 is at minimum volume. In this initial position of piston 252, its control sleeve 260 will have been moved by embossment 254 such that the plugged end 262 of the sleeve blocks communication between chambers 213 and 214. Also, in this initial position of piston 215, its valve member 46 is in the position shown wherein it closes a valve within the backwash filter, thereby preventing a backwash operation.

When the line pressure is turned on, the water flows to the filter body of the filter, and since the filter body is still clean, the pressure on its downstream side as applied to port 136' is substantially equal to the pressure at its upstream side as applied to port 138', so that displaceable member 210 is located within valve opening 206, thereby blocking communication between chambers 212 and 213.

As the dirt removed by the filter accumulates on its upstream surface, the pressure drop across the filter body increases, thereby reducing the pressure at the downstream side. This downstream pressure is transmitted, via port 136', to chamber 212 of the control unit 20 so that as the pressure differential increases, the upstream pressure in chamber 211 tends to move stem 220 of displaceable member 210 through opening 206 in the partition wall 204, against the action of spring 236. When this differential-pressure reaches a predetermined magnitude, indicating an undue amount of dirt accumulating on the upstream face of the filter body, the reduced cross-sectional area section 222 of stem 220 becomes located within opening 206, which thereby establishes communication between chambers 212 and 213 on opposite sides of the partition wall 204. When this occurs, the downstream filter pressure in chamber 212 is communicated to chamber 213, thereby causing piston 215 to move away from the partition walls 204 against the action of spring 250. This movement of piston 215 causes it to move its valve member leftwardly to initiate a backwash operation, as described in the above-cited patent application.

Early during the displacement of piston 215 which started the backwash operation, the piston passes port 124', thereby connecting the latter port to chamber 213 of a sustainer valve assembly in the filter to sustain the pressure therein during the backwash operation, and also to actuate a timer which terminates the backwash operation, if not terminated by a preset time interval, both as described in the above-cited patent application.

When piston 215 reaches its fully actuated position, wherein chamber 213 is of maximum volume and chamber 214 is of minimum volume, sleeve 266 movable within the piston engages the annular abutment 264 of end wall 251, thereby shifting the sleeve to the position illustrated in the drawing, wherein its plugged end 262 and also its radial bore 266, are disposed within chamber 213, thereby establishing communication between this chamber and the interior of the sleeve. However, the opposite side of sleeve 260 is still in engagement with abutment 264, and therefore there is still no effective communication between chambers 213 and 214 on the opposite sides of the piston.

This is the condition of the control device so long as stem 220 of the differential-pressure sensing member 210 is located with its section 222 disposed within valve opening 206, thereby transmitting the downstream-filter pressure from chamber 212 to chamber 213. However, as soon as the filter body has been sufficiently cleaned by the backwash operation so as to reduce the pressure drop across it the desired amount, differential-pressure sensor 210 moves its stem 220 back to its normal position with section 224 of the stem located within opening 206, thereby terminating the communication between chambers 212 and 213. As soon as this occurs, the slow-acting vent 267 formed through piston 215 starts to vent the pressure within chamber 213 to the atmosphere via chamber 214 and port 268'. After the pressure within chamber 213 has thus dropped sufficiently, spring 250 moves piston 215 away from abutment 264. As soon as the end of sleeve 260 separates from abutment 264 the pressure within chamber 213 is immediately vented to the atmosphere via the interior of sleeve 260, chamber 214, and port 268', whereupon spring 250 quickly returns piston 215 back to its normal, retracted position, against partition wall 204. As this occurs, sleeve 260 is again moved by embossment 254 to bring its plugged end within the bore in piston 215, thereby effectively interrupting the communication between chambers 213 and 214. When piston 215 is thus returned to its fully retracted position against partition wall 204, its valve member 46 is moved back to close the valve opening and thereby to terminate the backwash operation.

After a backwash operation has started, it may occur that the pressure at the downstream side of the filter still does not rise, but rather further drops. This might indicate some malfunction in the device which could be caused, for example, by a jam or by the presence of such a large amount of dirt within the supply line that the filter is incapable of cleaning the filter body faster than the dirt accumulates thereon. In either event, the differential-pressure sensing member 210 is further displaced to bring the enlarged cross-sectional section 225 into opening 206 through the partition wall 204, thereby terminating the communication between chambers 212 and 213. This will also terminate the backwash operation and thereby prevent the wastage of water.

From the foregoing, it will be seen that the differential-pressure sensor 210 may assume any one of three positions, namely: (1) a normal position during the normal filtering mode of the filter wherein its ring 224 is disposed within the partition wall opening 206 to terminate communication between chambers 212 and 213; (2) a first actuated position reached when the differential-pressure between the upstream and downstream sides of the filter body rises to a predetermined magnitude to initiate a backwash operation, in which case the reduced-area section 222 of stem 220 is located within opening 206; and (3) a second actuated position reached when the differential-pressure increase to a second predetermined magnitude, higher than the first, whereupon the larger cross-sectional section 225 of the stem 220 becomes located within the partition wall opening 206 to again terminate the communication between chambers 212 and 213, resulting in the termination of the backwash operation. All three of these conditions of the filter are immediately indicated to the observer by the extent of projection of the stem 220 through collar 228 of the control device housing 202, and particularly by the colored rings 232 carried a the end of the stem.

It will also be appreciated that this projection of stem 220 externally of the control device not only indicates the state of the filter (i.e. under which condition it is then in, and/or how close it is to initiating a backwash operation), but also may be used for manually controlling the filter to initiate a backwash operation by pressing it to the above-described first actuated position of the stem, or to terminate the backwash operation by further pressing it to the second actuated position, or returning it to its home position.

What is claimed is:

1. A fluid pressure control device for actuating an external device, comprising:

a housing having a partition wall dividing its interior into at least two compartments;

said partition wall being formed with an opening therein establishing communication between said two compartments;

a displaceable member displaceable in one of said compartments and defining a first and a second chamber on opposite sides thereof;

a stem fixed to said displaceable member;

a valve member carried at one end of said stem and movable thereby to open and close said valve opening;

a spring biassing said displaceable member to the position wherein its valve member closes said valve opening;

a first inlet port in said housing communicating with the chamber on the side of the displaceable member opposite to said partition wall, for inletting a first control pressure;

a second inlet port in said housing communicating with the chamber between the displaceable member and the partition wall for inletting a second control pressure into said chamber effective, when said second control pressure is lower than said first control pressure by a predetermined magnitude, to cause said first control pressure to displace said displaceable member against the bias of said spring to move said valve member to open the valve opening, and thereby to transfer said second control pressure via said valve opening to said second compartment;

and means communicating with the second compartment for actuating said external device in response to the transfer of said control pressure from said inlet port to said second compartment.

2. The device according to claim 1, wherein the end of said stem opposite to that of said valve member passes through an opening in said housing and projects exteriorly thereof permitting manual displacement of said stem and said displaceable member and valve member carried thereby.

3. The device according to claim 2, wherein said projecting end of the stem carries an indicator button to manually indicate the position of said displaceable member.

4. The device according to claim 1, wherein said valve member is integrally formed with said one end of the stem and includes a first section having a cross-sectional area equal to that of the valve opening so as to close it when the difference in pressure at said two inlet ports is below said predetermined magnitude, and a second section adjacent to said first section and having a smaller cross-sectional area so as to open said valve opening when the sensed difference in pressure rises to said predetermined magnitude.

5. The device according to claim 4, wherein said one end of the stem includes a third section adjacent to said second section and on the side thereof opposite to said first section, said third section having a cross-sectional area at least equal to that of the valve opening so as to reclose it when the sensed difference in pressure rises to a second predetermined magnitude above said first-mentioned predetermined magnitude.

6. The device according to claim 1, wherein said displaceable member comprises a diaphragm clamped at its outer periphery to said housing and at its inner periphery between a first member secured to said stem and a second member secured to said first member.

7. The device according to claim 1 wherein said second compartment of the housing includes a second displaceable member defining a third chamber on the side thereof facing said partition wall, and a fourth chamber on the opposite side thereof;

said device further including a coupling between said second displaceable member and the external device to be actuated thereby such that the latter device is actuated upon the displacement of said second displaceable member in the direction of expanding said third chamber and contracting said fourth chamber;

said second displaceable member including a control member effective to establish communication between said third and fourth chambers through said second displaceable member when the latter member is in its extreme extended position wherein said third chamber is at maximum volume, and to block communication between said third and fourth chambers when the second displaceable member is in its extreme retracted position wherein said third chamber is at minimum volume.

8. The device according to claim 7, wherein said second displaceable member in the second compartment is a piston.

9. The device according to claim 8, wherein said control member is in the form of a sleeve displaceable in said piston, said sleeve being open at the end opposite side to said partition wall, and being closed at the end facing said partition wall but including a radially-extending bore adjacent to said latter end; the chamber at the side of said piston opposite to that of said partition wall including a slow-acting venting opening, a surface effective to close the open end of the sleeve in the chamber when the piston is in its extreme extended postion wherein the chamber between it and the partition wall is at maximum volume, and a spring biasing said piston away from said latter surface, whereby said venting opening enables said spring to move the piston away from said latter surface to open the respective end of the sleeve, thereby venting said chamber between the piston and the partition wall to the atmosphere via said sleeve and said radially-extending bore therethrough.

10. The device according to claim 9, wherein said displaceable member in said first compartment also includes means effective to re-close said valve opening when the difference in pressure at said two inlet ports, rises to a second predetermined magnitude higher than said first predetermined magnitude.

11. A differential-pressure control device effective to actuate an external device when the differential-pressure between a high-pressure fluid source and a lower pressure fluid source rises to a predetermined magnitude, comprising:

a housing having a partition wall therein dividing its interior into at least two compartments, said partition wall being formed with an opening therethrough establishing communication between the two compartments;

a differential-pressure sensing member disposed in one of said compartments and movable therein in response to the sensed differential-pressure, said differential-pressure sensing member defining a first and a second chamber on opposite sides thereof;

a valve member carried by said differential-pressure sensing member and movable thereby with respect to said valve opening;

means biasing said displaceable member in a direction wherein its valve member closes said valve opening, the displaceable member being displaceable to cause its valve member to open said opening when the sensed differential-pressure rises to a first predetermined magnitude;

said second compartment of the housing including a displaceable member defining a third chamber on the side thereof facing said partition wall, and a fourth chamber on the opposite side thereof;

and a coupling between the said displaceable member and the external device to be actuated thereby such that the latter device is actuated upon the displacement of said displaceable member in the direction of expanding said third chamber and contracting said fourth chamber;

said displaceable member including a control member effective to establish communication between said third and fourth chambers through said displaceable member when the latter member is in its extended position wherein said third chamber is at maximum volume, and to block communication between said third and fourth chambers when the displaceable member is in its extreme retracted position wherein said third chamber is at minimum volume.

12. The device according to claim 11, wherein said displaceable member in said second compartment is a piston, and said control member is in the form of a sleeve displaceable in said piston, said sleeve being open at the end opposite to said partition wall, and being closed at the end facing said partition wall but including a radially-extending bore adjacent to said latter end;

the chamber at the side of said piston opposite to that of said partition wall including a slow-acting venting opening, a surface effective to close the open end of the sleeve in the chamber when the piston is in its extreme extended position wherein the chamber between it and the partition wall is at maximum volume, and a spring biasing said piston away from said latter surface, whereby said venting opening enables said spring to move the piston away from said latter surface to open the respective end of the sleeve, thereby venting said chamber between the piston and the partition wall to the atmosphere via said sleeve and said radially-extending bore therethrough.

13. The device according to claim 12, wherein said differential-pressure sensing member in said first compartment also includes means effective to reclose said valve opening when the sensed differential-pressure rises to a second predetermined magnitude higher than said first predetermined magnitude.

14. The device according to claim 13, wherein said valve member includes a stem carried by said differential-pressure sensing member, which stem includes a first region closing said valve opening when the sensed differential-pressure is below said first-mentioned predetermined magnitude, opens said valve opening when the sensed differential-pressure rises to said first predetermined magnitude, and recloses said valve opening when the sensed differential-pressure rises to said second predetermined magnitude.

* * * * *